Figure 1:
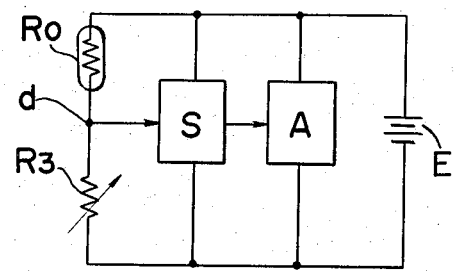

United States Patent [19]
Yoshiyama

[11] 3,824,606
[45] July 16, 1974

[54] PHOTOGRAPHIC EXPOSURE CONDITION INDICATING DEVICE

[75] Inventor: Ichiro Yoshiyama, Kobe, Japan

[73] Assignee: Minolta Camera Kabushiki Kaisha, Osaka-ku, Japan

[22] Filed: Mar. 2, 1973

[21] Appl. No.: 337,480

[30] Foreign Application Priority Data
Mar. 17, 1972  Japan............................... 47-27911
Mar. 24, 1972  Japan............................... 47-30128

[52] U.S. Cl............. 95/10 CE, 95/10 CT, 95/53 E
[51] Int. Cl..................... G03b 7/08, G03b 17/18
[58] Field of Search.......... 95/11 R, 10 C, 53 E, 57, 95/10 CT, 10 CE, 53 EA, 53 EB

[56] References Cited
UNITED STATES PATENTS
3,397,629  8/1968  Mori et al. ......................... 95/10 C
3,452,347  6/1969  Stimson ........................... 95/10 CE
3,460,450  8/1969  Ogihara............................. 95/10 C
3,648,053  3/1972  Sato................................. 95/10 CT
3,678,821  7/1972  Kitai................................. 95/10 CT
3,688,657  9/1972  Ueda................................. 95/10 CT Primary Examiner—Robert P. Greiner
Attorney, Agent, or Firm—Wenderoth, Lind & Ponack

[57] ABSTRACT

In a photographic camera having a shutter the speed of which is automatically controlled, the photographic exposure condition indicating device comprising a light sensitive element, a switching circuit responsive to an output signal from the light sensitive element and an indicating circuit including an electric lamp responsive to the switching circuit, both being disposed in parallel to the light sensitive element and with respect to each other, for operating the lamp when the output signal attains a predetermined value, and a variable resistor for varying the predetermined value of the output signal, whereby the critical shutter speed at which the photographer can steadily hold the camera without wobbling the latter can be varied as desired or required.

6 Claims, 5 Drawing Figures

PHOTOGRAPHIC EXPOSURE CONDITION INDICATING DEVICE

The present invention relates to a still camera having a shutter the speed of which is automatically controlled and, more particularly, to an exposure condition indicating device for use in the still camera for indicating to a photographer a possibility of occurrence of wobbling of the camera at a preselected low shutter speed and also for indicating to the photographer that the highest shutter speed or the lowest shutter speed of the camera does not accommodate the light condition in which a subject to be photographed is placed.

A wobbling indicating device is heretofore known and acts to indicate to the photographers a possibility that the camera is likely to be wobbled during the actual shooting if the shutter speed is automatically controlled at a lower value than the critical shutter speed at which the photographer can steadily operate the camera. This known wobbling indicating device includes a signaling element, for example, an electric lamp or a light emissive diode, and is designed so as to operate at a single gradation, for example, one-thirtieth or one-fifteenth second, of the shutter speed to thereby activate the signaling element to indicate the possibility of camera wobbling.

The critical shutter speed at which condition the photographer can steadily operate the camera varies depending upon the skill the photographer possesses and-/or the focal length of an objective assembly of the camera he uses. Despite of this fact, the signaling element in the known wobbling indicating device operates when the shutter speed attains a fixed operating value controlled, for example, by a built-in exposure meter, which is substantially equal to the critical shutter speed as defined above. This is obviously inconvenient. Firstly, assuming that the operating shutter speed at which the signaling element of the wobbling indicating device operates is one-thirtieth and the critical shutter speed is substantially equal to the operating shutter speed, a photographer may well steadily operate his camera having the objective assembly of a particular focal length which is interchangeably mounted on the body of the camera. However, when it comes to the camera having the objective assembly of a greater focal length than that of the objective assembly previously interchanged, there will be a possiblity that the same photographer may cause a camera wobbling because of a relatively high magnification and/or a relatively great weight of the objective assembly of the greater focal length. Secondly, in view of the fact that the critical shutter speed varies depending upon the skill of the photographer as stated above, substantial equalization of the operating shutter speed to the critical shutter speed results in that a single camera having a particular objective assembly cannot be utilized by different photographers in the sense that the wobbling indicating device does not timely operate with respect to the skill each photographer possesseses.

Accordingly, it is an object of the present invention to provide an improved exposure condition indicating device for use in a still camera having a built-in variable speed shutter, wherein the operating shutter speed at which condition the device operates to indicate a possibility of camera wobbling can be varied as required or desired depending upon the crtical shutter speed characterized by the skill different photographers may possess, thus substantially eliminating the inconveniences inherent in conventional devices.

Another object of the present invention is to provide the improved exposure condition indicating device of the type above referred to, which also functions to indicate to a photographer that the light condition in which a subject to be photographed is placed is out of range of the camera exposure capacity. In other words, the exposure condition indicating device according to the present invention is additionally provided with means for indicating to a photographer that the highest shutter speed or the lowest shutter speed does not accommodate the light condition, which may otherwise results in overexposure or underexposure, respectively.

A further object of the present invention is to provide the improved exposure condition indicating device of the type referred to above which can be manufactured at relatively low cost and can be incorporated in the camera without substantially increasing the size of the camera.

A still further object of the present invention is to provide the improved exposure condition indicating device of the type above referred to, which is reliable in performance.

According to the present invention, the exposure condition indicating device essentially comprises indicating means, means including a light sensitive element for measuring the brightness of a scene to be shot and generating an output signal indicative of the brightness of the scene, control means responsive to the output signal for actuating the indicating means when the brightness is lower than a predetermined value, and means for varying the predetermined value of the output signal.

In this arrangement, one of the advantages of the system is that the shutter speed at which the indicating means operates to indicate to a photographer a possibility of camera wobbling which may occur when the shooting is performed with the camera speed shutter set at such shutter speed or a shutter speed lower than such shutter speed. When the indicating means operates in the manner as hereinabove described, what the photographer should do is to steadily hold the camera or to use a camera support.

According to another embodiment of the present invention, the exposure condition indicating device is additionally provided with means for indicating to a photographer that the brightness of a scene to be shot is out of range of the camera exposure capacity. This provision results in an advantage in that overexposure or underexposure can be avoided.

Figure 2:
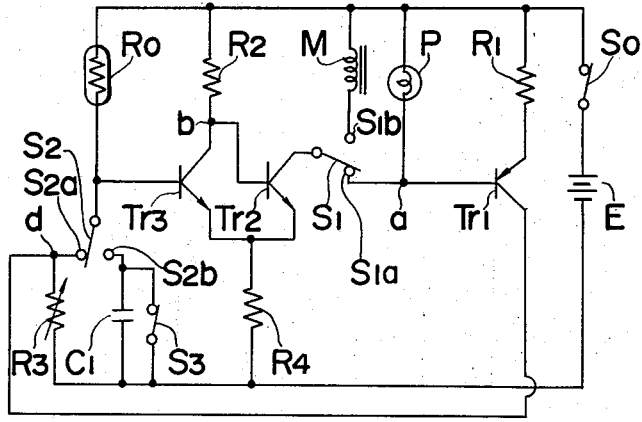
Figure 3:
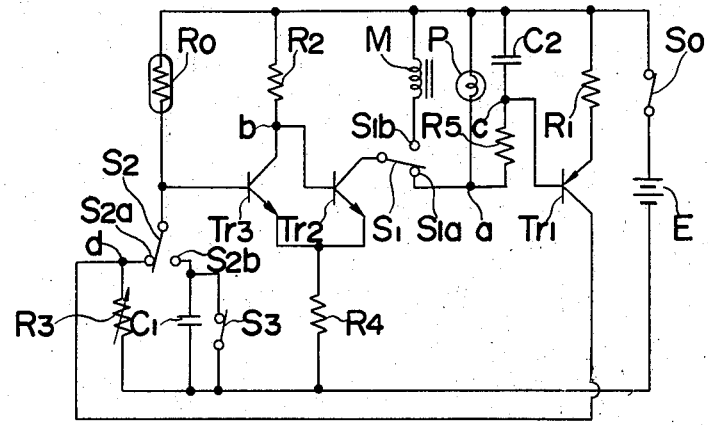
Figure 4:
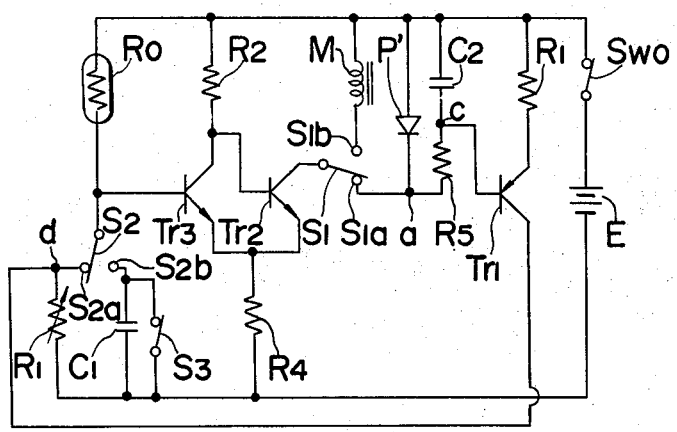
Figure 5:
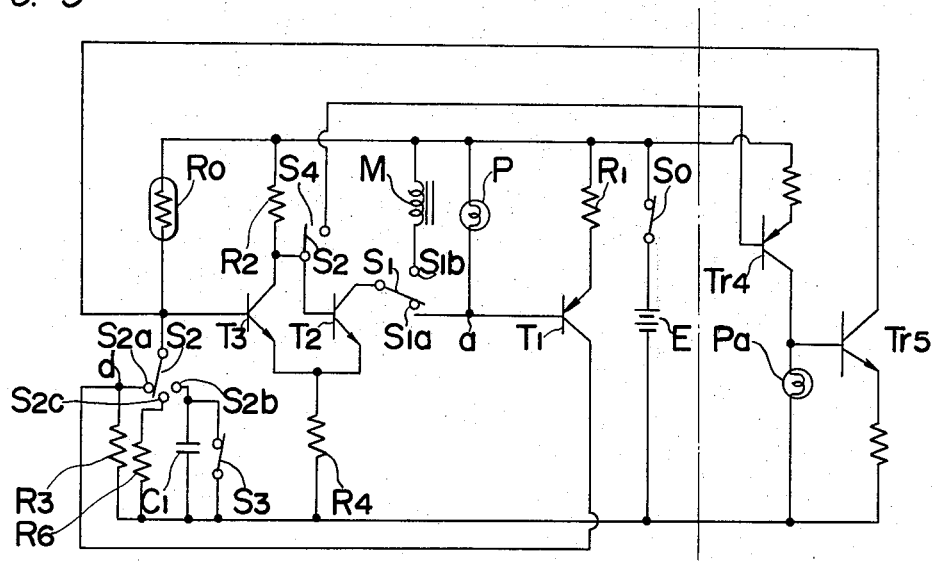

These and other objects and features of the present invention will become apparent from the following description taken in conjunction with preferred embodiments thereof with reference to the accompanying drawings, in which;

FIG. 1 is a schematic block diagram showing the principle of an exposure condition indicating device according to the present invention, FIG. 2 is a circuit diagram of one embodiment of the present invention based on the principle of FIG. 1, FIG. 3 is a similar diagram to FIG. 2, showing another embodiment of the present invention, FIG. 4 is a similar diagram to FIG. 2, showing a further embodiment of the present invention, and FIG. 5 is a circuit diagram of a still further embodiment of the present invention.

Before the description of the present invention proceeds, it is to be noted that like parts are designated by like reference numerals throughout the accompanying drawings.

Referring now to FIG. 1, the exposure condition indicating device according to the present invention generally comprises a photosensitive element Ro, a variable resistor R3 and a battery power source E, all connected in series in the order given above, a switching circuitry S and a indicating circuitry A, both being disposed in parallel with the power source E, said switching circuitry S being adapted to receive a signal from a common junction between the photosensitive element Ro and the variable resistor R3 and to operate the indicating circuitry A when the level of the signal is lower than a predetermined level. The predetermined level of the signal to be applied to the switching circuitry S is determined by the setting of the variable resistor R3. Specifically, the voltage at the common junction d is varied in relation to the setting of the variable resistor R3 since the power voltage is divided in proportion to the ratio between the setting of the variable resistor R3 and the resistance of the photosensitive element Ro. The setting of the variable resistor R3 should be selected such that the predetermined level of the signal at the common junction d corresponds to the critical shutter speed at which a particular photographer can operate his camera without causing the camera to wobble during the picture taking operation.

While the indicating device of the present invention is basically designed such as hereinabove described, the conventional device of similar kind uses a fixed resistor in place of the variable resistor R3 employed in the present invention. In other words, the present invention is essentially featured by the use of the variable resistor R3 for the purpose mentioned above.

Referring to FIG. 2, the first preferred embodiment of the present invention is shown. It is to be noted that the circuit of FIG. 2 excepting an indicating lamp P, a transistor Tr1, a resistor R1 and a switch contact S1a is known as an electronic shutter control device for controlling the opening of the known focal-plane shutter in response to the amount of light falling on the photosensitive element P after having passed through a mechanical disphragm coupled to the lens aperture adjusting ring of a photographic camera so as to render the light amount falling on the photosensitive element to be substantially the same as that falling on the film through the objective assembly. For better understanding of the present invention, description will be first made as to the operation of the electronic shutter control device.

Assuming that a shutter release button of the photographic camera of, for example, focal-plane shutter type, is depressed, a main switch So associated therewith is closed. A movable switch contact S2 also associated with the shutter release button is, at this time, engaged with a fixed contact S2a. Since the lamp P, transistor Tr1, the fixed contact S1a and the resistor R1 are not taken into consideration in the description of the electronic shutter control device, the function of the resistor R3 is disregarded.

Upon closure of the main switch So, the circuit is brought into operation and, as the shutter release button is further depressed, the movable switch contact S2 is shifted to engage with the fixed contact S2b while the switch S1 is closed, i.e., engaged with a fixed contact S1b. Upon establishment of this condition, a transistor Tr3 and a transistor Tr2, constituting a Schmitt circuit, are respectively brought into non-conductive and conductive states thereby to energize an electromagnet M. The electromagnet M is associated with the focal plane shutter composed of a pair of leading and trailing curtains.

As is well known to those skilled in the art, the focal plane shutter is designed such that, while the leading and trailing curtains moved at the same speeds from one position to another, the slit opening between the leading and trailing curtains varies depending upon the setting of the shutter control dial. In other words, depression of the shutter button causes the leading curtain to move first and the trailing curtain is then moved with the slit of an opening formed between said curtains to determine a particular shutter speed required in a particular light condition.

The electromagnet M is utilized to delay the movement of the trailing curtain relative to the leading curtain to thereby determine the particular shutter speed required in the particular light condition. The linkage between the electromagnet M and the trailing curtain of the focal plane shutter is well known to those skilled in the art and, therefore, the details thereof are herein omitted. It is, however, to be noted that, at the time of energization of the electromagnet M, the trailing curtain is restrained from following the movement of the leading curtain.

When the shutter button is fully depressed, the leading curtain is permitted to move from one position to another across the focal plane of the camera objective assembly in a manner known by those skilled in the art and, at the same time, a switch S3, which is normally closed, is immediately opened, thereby causing a capacitor C1 in parallel with the siwtch S3 to be charged through the photosensitive element Ro, the charging rate of which substantially corresponds to the intensity of light sensed by the photosensitive element Ro. Accordingly, the base potential of the transistor Tr3 increases and, when this base potential attains a predtermined value, the transistor Tr3 is brought into the conductive state and the transistor Tr2 is consequently brought into the non-conductive state. Upon establishment of this condition, the electromagnet M is immediately deenergized, thereby permitting the trailing curtain of the shutter to move in pursuit of the leading curtain that has been previously moved, while forming the slit therebetween of an opening corresponding to a shutter speed selected in view of the preselected f/stop number for proper exposure conditions.

While the electronic shutter control device is constructed and functions in the manner as hereinbefore described, addition of the elements such as indicated by P, R1, Tr1 and S1a which are shown in FIG. 2, but omitted from the foregoing description results in the exposure condition indicating device according to the present invention. Functions of these elements will be hereinafter described, with the foregoing description in mind.

Assuming that the condition has been already established wherein the switch So is closed and the movable switch contact S2 is engaged with the fixed contact S2a with the movable switch contact S1 normally engaged with the fixed contact S1a as shown and that the determined shutter speed is substantially equal to or lower than the critical value because of insufficient lightening condition, the resistance of the photosensitive element Ro is greater than during the sufficient lightening condition and, accordingly, voltage at the common junction d is lower than a voltage necessary to trigger the transistor Tr3 on and to subsequently trigger the transistor Tr2 off. In other words, so long as the resistance of the photosensitive element Ro, which varies in response to the intensity of light sensed thereby, is of a value sufficiently high that the base potential of the transistor Tr3 does not attain a predetermined value, the transistors Tr3 and Tr2 are respectively maintained in the non-conductive and conductive states. In view of the foregoing, during conduction of the transistor Tr2, current flowing from the power source E through the lamp P flows through the transistor Tr2 and, therefore, the lamp P is lit, thereby indicating that the selected shutter speed is substantially equal to or lower than the critical value at which condition the photographer can steadily operate his camera.

It is to be noted that the lamp P in the embodiment of FIG. 2 is employed in the form of a tungsten filament lamp and, therefore, this lamp P is repeatedly turned on and off to give a noticeable indication by the reason as hereinafter described. As is well known by those skilled in the art, the resistance of a tungsten filament increases with increase of the temperature. With this in mind, at the moment the lamp P is initially lit, the potential at a junction a, i.e., the base potential of the transistor Tr1 is higher than a trigger potential necessary to trigger the transistor Tr1 on. However, once the lamp P has been lit, the resistance of the filament increases due to heating of the filament and, consequently, the base potential of the transistor Tr1 is lowered thereby permitting the transistor Tr1 to be activated. Upon conduction of the transistor Tr1, current from the power source E across the resistor R1 flows through the transistor Tr1 to the resistor R3 thereby increasing the potential at the common junction d to a value higher than the predetermined potential necessary to trigger the transistor Tr3 on. When the potential at the junction d, i.e., the base potential of the transistor Tr3 attains the predetermined value, the transistor Tr3 can be triggered on and consequently the transistor Tr2 off, whereby the lamp P is deactivated. At the same time, the transistor Tr1 is triggered off and no current flows therethrough to the resistor R3, thus lowering the potential at the common junction d so that the lamp P is, as a result thereof, turned on again. In the manner as described above, the heat capacitance of the tungsten filament of the lamp P acts as a delay line and the whole circuit undergoes relaxation oscillation by the varying heat capacitance of the tungsten filament lamp P On the other hand, in the case where the lighting condition where the subject to be photographed is placed is sufficient, the resistance of the photosensitive element Ro is relatively low and, accordingly, the base potential of the transistor Tr3 is sufficiently high enough to maintain the transistor Tr3 in the conductive state. Therefore, it is clear that the lamp P is not turned on and no circuit undergoes the relaxation oscillation.

Further depression of the shutter release button causes the movable switch contact S1 to engage with the fixed contact S1b and the movable switch contact S2 to engage with the fixed contact S2b and, upon completion of the depression thereof, the switch S3 is opened as hereinbefore described, thereby permitting the trailing curtain of the shutter to run in pursuit of the previously moved leading curtain in the manner as hereinbefore described.

It is possible to provide an electro-mechanical locking device in parallel relation to the lamp P for restraining the shutter release button from being further depressed when the lamp P is operated.

In the embodiment shown in FIG. 3, a series circuit composed of a capacitor C2 and a resistor R5 is additionally provided for lengthening the cycle of alternate switching on and off of the lamp P. It is to be noted that the capacitor C2 acts as a delay line in cooperation with the heat capacitance of the tungsten filament of the lamp P.

In the arrangement of FIG. 3, although the circuit functions in a substantially similar manner as in the foregoing embodiment, voltage stored on the capacitor C2 at the time of illumination of the lamp P is zero and, accordingly, the transistor Tr1 is maintained in the non-conductive state. At this time, the voltage across the lamp P is stored on the capacitor C2 and, when the stored voltage attains an appropriate value necessary to trigger the transistor Tr1 on, the latter is immediately triggered on.

Thus, from the foregoing description, it is clear that, by suitably selecting the time constant of the series circuit, i.e., the CR network, the cycle of alternate switching off and on of the lamp P can be advantageously lengthened, as compared with that of the lamp P in the foregoing embodiment of FIG. 2.

An example of the use of a light emissive diode in place of the lamp P is shown in FIG. 4. Since the light emissive diode P' itself does not exhibit an oscillating characteristic as has been exhibited by the tungsten filament lamp P, the employment of the light emissive diode is possible only in the circuit arrangement of FIG. 3. In other words, alternate switching off and on of the light emissive diode P' in the circuit arrangement of FIG. 4 is achieved by the CR network composed of the capacitor C2 and the resistor R5.

In any one of the foregoing embodiments shown in FIGS. 2, 3 and 4, respectively, if the resistor R1 is selected to be of a resistance sufficiently high so as to maintain the current flowing through the transistor Tr1 at a relatively low value during the conductive state thereof, in the case where the determined shutter speed is slightly lower than the critical value, the current flowing through the resistor R1 by means of the transistor Tr1 is superimposed with the current flowing through the photosensitive element Ro by means of the switch S2 then engaged with the fixed contact S2a thereby rendering the circuit arrangement in condition to undergo relaxation oscillation and, in the case where the determined shutter speed is greatly lower than the critical value, the potential at the junction d does not attain the predetermined value necessary to trigger the transistor T43 on even though the current flowing through the resistor R1 by means of the transistor Tr1 is superimposed with the current flowing through the photosensitive element Ro by means of the switch S2 then engaged with the fixed contact S2a whereby the indicating lamp P or P' can be continuously lit. In other words, the indicating lamp can be operated in two stages, which is advantageous in that the alternate switching off and on of the lamp indicates an insufficient lightening condition, but acceptable by the latitude of the light sensitive film used whereas the continuous illumination of the lamp indicates an insufficient lightening condition which the use of light sensitive film will not overcome.

In the embodiment shown in FIG. 5, means for indicating the lighting condition in which a subject to be photographed is placed, which is out of range of the camera exposure capacity is additionally provided. This indicating means may be applicable to any of the foregoing embodiment, but will be described as applied to the circuit arrangement of FIG. 2.

In the circuit arrangement of FIG. 5, for the purpose mentioned above, a transistor Tr4, a transistor Tr5, an indicating lamp Pa, a resistor R6, a fixed contact S2c and a switch S4 are additionally provided. In this arrangement, the switches So, S1, S2 and S4 are operatively associated with the shutter release button in such a way that, as said shutter release button is first depressed, the switches So is closed while the switches S1, S2 and S4 are maintained in respective conditions as shown; as said shutter release button is further depressed, the switch S4 is closed and the switch S2 is engaged with the fixed contact S2c; and, when the shutter release button is fully depressed, the switch S1 is engaged with the fixed contact S1b, the switch S4 is opened and the switch S2 is engaged with the fixed contact S2b.

Indication of a possibility of a shutter speed below the critical value is given when the shutter release button has been fully depressed, in case of the insufficient lightening condition. However, in case of an excessive lightening condition with respect to the camera exposure capacity, i.e., the highest shutter speed achievably by the particular camera, the transistor Tr3 can be triggered on in the manner as hereinbefore described and, as a result thereof, the transistor Tr4 is triggered on thereby permitting the lamp Pa to be switched on to indicate the fact that the determined shutter speed is still lower than the minimum shutter speed required under such lightening condition.

It is to be noted that the resistor R6 acts to detect whether or not the lighting condition is excessive with respect to the highest shutter speed achievable by the particular camera and, for this purpose, it is disposed in parallel to the variable resistor R3.

The transistor Tr5 is utilized to oscillate the circuit arrangement. This transistor Tr5 is in the non-conductive state at the moment the lamp Pa is lit and, however brought into the conductive state upon increase of the resistance of the filament of the lamp Pa. Upon conduction of the transistor Tr5, the resistor R6 is shortcircuited and, accordingly, the potential at the junction d is lowered thereby to trigger the transistor Tr3 off whereby the circuit arrangement undergoes relaxation oscillation.

When one or both of the lamps P or P' and Pa are operated in the manner as hereinbefore described, the photographer should take necessary steps such as to adjust the lens aperture adjusting ring until the lamps cease to operate. Thereafter, what is necessary is to complete the depression of the shutter release button, in which condition, the switch S1 is engaged with the fixed contact S1b while the switch S2 is closed to permit the capacitor C2 to be charged, the switch S4 being opened, whereby the electromagnet M is disenergized to permit the trailing curtain to run in pursuit of the leading curtain.

Although the present invention has been fully described in conjunction with the preferred embodiments thereof, it is to be noted that various changes and modifications are apparent to those skilled in the art. By way of example, without employing the resistor R3 in the form of a variable resistor, the resistor R4 may be employed in the form of a variable resistor. Even in this case, the circuit arrangement functions satisfactorily. Moreover, although in the foregoing embodiments the Schmitt circuit essentially including the transistors Tr1 and Tr2 has been described as a switching circuit for the lamp and constituting a part of a relaxation oscillation circuit, a separate oscillation circuit may be employed for the same purpose. In this case, the separate oscillation circuit should be operated by the output from the transistor Tr2 in view of the fact that the transistor Tr2 is always brought into the conductive state when the lightening condition is insufficient with respect to the proper exposure conditions required.

Therefore, these changes and modifications should be construed as included within the true scope of the present invention unless otherwise they depart therefrom.

What is claimed is:

1. In a photographic camera including a shutter the speed of which is automatically controlled, the combination comprising means for indicating to a photographer that a shutter speed determined thereby is lower than the critical value at which the photographer can steadily hold the camera without wobbling the camera comprising a light sensitive element for measuring the brightness of a scene to be shot and generating an output signal indicative of the brightness of the scene, control means responsive to the output signal for actuating said indicating means when the brightness sensed by said light senesitive element is lower than a predetermined value, and means for varying the predetermined value of said output signal in accordance with the critical value determined by the skill of the photographer and the focal length of an objective lens assembly used.

2. The photographic camera as claimed in calim 1, wherein said indicating means comprises an electrical lamp.

3. The photographic camera as claimed in claim 2, wherein said electrical lamp is a tungsten filament lamp.

4. The photographic camera as claimed in claim 1 wherein said indicating means comprises a light emissive diode.

5. The photographic camera as claimed in claim 1, wherein said varying means comprises a variable resistor.

6. The photographic camera as claimed in claim 1, further comprising an additional means for indicating to the photographer that the determined shutter speed is out of range of the camera exposure capacity and means responsive to the output signal for actuating said additional indicating means when the brightness of the scene is beyond the camera exposure capacity.

* * * * *